United States Patent [19]

Lesar et al.

[11] Patent Number: 4,844,619
[45] Date of Patent: Jul. 4, 1989

[54] SAMPLING MECHANISM FOR A MEAT MIXING MACHINE

[75] Inventors: Nick J. Lesar, Palmyra; Richard Buschel, Helenville; James H. Schumacher, Whitewater, all of Wis.

[73] Assignee: Weiler & Co., Whitewater, Wis.

[21] Appl. No.: 37,643

[22] Filed: Apr. 13, 1987

[51] Int. Cl.[4] .......................... B01F 7/04; B01F 7/08; B01F 15/02; B02C 18/22
[52] U.S. Cl. .................. 366/133; 241/82.5; 241/101.6; 366/140; 366/157; 366/158; 366/186; 366/192; 366/196; 366/299; 366/300
[58] Field of Search ............... 366/131, 133, 140, 154, 366/150, 156, 158, 186, 192, 194, 195, 196, 266, 297, 300, 318, 325, 301, 299, 157; 241/98, 82.1, 82.5, 101 B, 101.2, 101.5, 101.6; 198/579, 577, 671, 675

[56] References Cited

U.S. PATENT DOCUMENTS

| | | | |
|---|---|---|---|
| 514,048 | 2/1894 | Wagner | 366/300 |
| 1,170,842 | 2/1916 | Newhouse | 198/579 X |
| 1,344,675 | 6/1920 | Bubar et al. | 366/300 |
| 2,800,238 | 7/1957 | Oliver | 366/156 X |
| 2,947,524 | 8/1960 | Bridges | 366/300 |
| 3,548,902 | 12/1970 | Holly | 241/101.2 |
| 3,570,569 | 3/1971 | Hartley et al. | 366/186 X |
| 3,901,483 | 8/1975 | Lasar | 366/299 X |
| 4,512,523 | 4/1985 | Higashimoto | 241/82.5 X |

Primary Examiner—Harvey C. Hornsby
Assistant Examiner—Scott J. Haugland
Attorney, Agent, or Firm—Andrus, Sceales, Starke & Sawall

[57] ABSTRACT

A mixer for mixing materials, such as coarsely chopped meat, during a mixing operation prior to a grinding operation, is provided with a tub (12), mixing means such as one or more paddle assemblies, and an auger (34) in the bottom of said tub. Both the auger and the paddle assemblies may be operated in either a clockwise or a counterclockwise direction. An auger housing (38) extends from the tub and houses a portion of the auger (34) which extends from an end of the tub. An opening is provided in the auger housing (38), which is surrounded by a hopper (40). Loading of the mixer is accomplished by feeding the meat into the hopper (40). The meat passes through the opening in the auger housing (38) and is introduced into the auger (34) so as to be conveyed into the tub (12) by the auger (34) during the loading operation. The direction of rotation of the auger (34) may be reversed in order to unload the mixed meat from the mixer. A discharge means (56) cooperates with the auger (34) for unloading the mixer. A sample grinder (64) is connected to the mixer for providing a ground sample of the mixed materials prior to performance of the grinding operation. The sample grinder is mounted on the mixer so that its longitudinal axis is substantially perpendicular to the longitudinal axis of the auger (34).

3 Claims, 2 Drawing Sheets

SAMPLING MECHANISM FOR A MEAT MIXING MACHINE

BACKGROUND AND SUMMARY

This invention relates to meat mixing machines, in particular to machines for mixing and blending different types of meat material into a homogeneous blend.

A meat mixer or blender is generally used to mix meat materials, such as coarsely chopped meat particles of approximately ⅜ inch diameter, during a mixing operation prior to performance of a final grinding operation. A mixer generally includes a tub for containing the meat material, one or more mixing elements for performing the mixing operation, a feed means such as a screw conveyor for loading the mixer, a discharge means for unloading the mixer, and one or more motors for driving the aforesaid elements. In a typical installation, a screw conveyor loads the mixer by discharging meat materials into the open top of the tub. Such an installation can result in difficulties when height clearance problems are encountered. Further, this arrangement results in a somewhat slow mixing process since the materials are simply dumped into the mixer, after which the mixing elements must take over to perform the mixing operation.

During the mixing operation, it is desirable to take one or more samples of the mixed meat materials, so as to test the mixture for compliance with specifications prior to the final grinding operation. For example, information such as the fat content of the mixture should be known prior to final grinding. In the past, samples, have been taken by stopping the mixing operation periodically and manually reaching down into the open top of the mixer to obtain a sample. This manual sampling procedure is time-consuming. Additionally, sampling in this manner does not yield a representative sample of the mixture. This is because the mixer is not running at the time of sampling, so that the various zones of mixing cannot be represented in the sample.

It is also possible to sample the meat mixture during the final grinding operation. However, such sampling is inefficient and cumbersome, since no remedial steps can be taken prior to the final grinding operation in the event testing reveals that the mixture is outside of specifications.

It is the object of the present invention to overcome the above problems. Accordingly, a meat mixing machine, including a tub and mixing means for performing a mixing operation, is provided with charging means for loading the meat materials into the mixer so that the materials enter the mixer at a point below the top of the mixer. More specifically, a mixer is provided with an auger at its bottom for moving the materials from one end of the tub to another during the mixing operation, and for discharging the materials after mixing. This auger has a portion of its length projecting outwardly from the tub, and is surrounded by an auger housing for forming a screw conveyor for discharging materials from the tub. Discharge means is provided at the end of the auger housing for discharging the mixed materials from the auger housing. An opening is provided in the top of the auger housing and an inlet hopper connected to the auger housing to permit the meat materials to be introduced to the auger through the opening for conveying the meat inwardly toward the interior of the tub for loading the mixer. This positioning of the inlet solves height clearance problems, and also creates a desirable mixing action.

The bottom loading feature provides for efficient and highly satisfactory loading of the meat materials into the mixer, by utilization of the unload auger which is typically found in most meat mixer installations. In the past, this aguer has been used only for unloading and for mixing; its use as a means for loading the mixer results in efficient loading and yields highly improved mixing action.

Further, the mixer is provided with sampling means mounted on the mixer for obtaining a ground sample of the materials while the mixing operation is underway and prior to the grinding operation. With the sampling means, the materials can be tested for compliance with specifications prior to the final grinding operation. More specifically, an inlet is provided in the bottom of the mixer for allowing a sample of the materials to pass therethrough during the mixing operation. A conveying means, such as a worm, leads from the inlet for transporting the sample to a grinder. The worm forces the sample of the material, such as meat, through the grinder for providing a ground sample prior to performance of the final grinding operation.

The sampling means provides an efficient and safe means for obtaining a representative ground sample of the mixed meat material prior to performance of the grinding operation.

BRIEF DESCRIPTION OF THE DRAWINGS

The drawings illustrate the best mode presently contemplated of carrying out the invention.

In the drawings.

DETAILED DESCRIPTION

Figure 1:
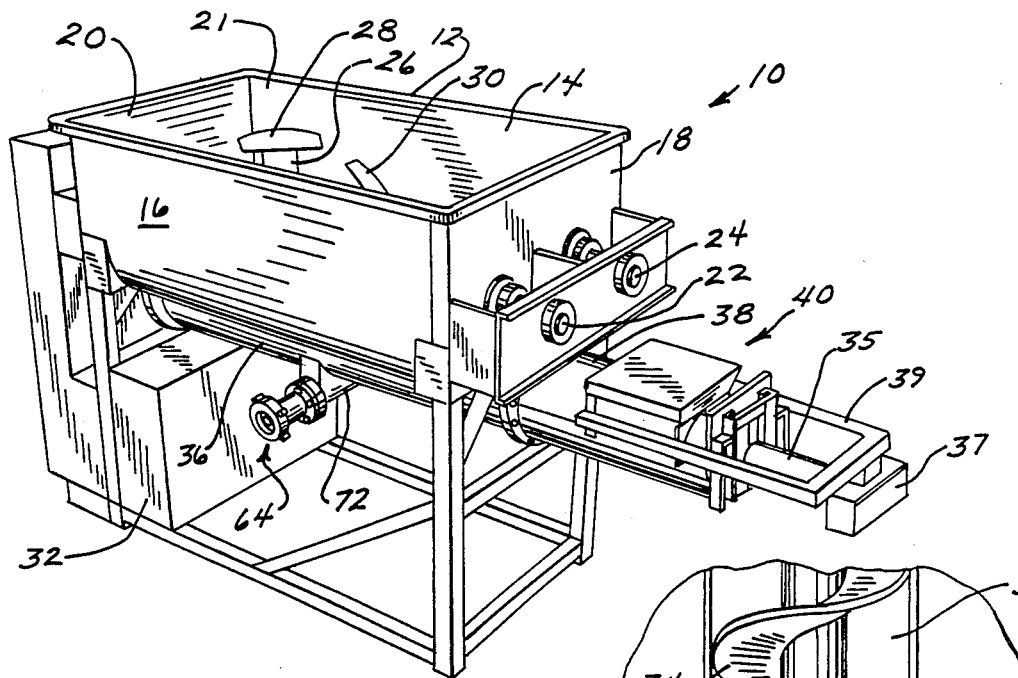
FIG. 1 is a perspective view of a meat mixing machine.

As shown in FIG. 1, a meat mixing machine 10 includes a tub 12 having an open top. Mixer 10 is adapted to mix materials, such as coarsely chopped meat having a diameter of approximately ⅜ inch, during a mixing operation prior to a grinding operation. It should be understood, however, that mixer 10 may be used for mixing a variety of meat materials.

The mixing operation creates a homogeneous meat mixture having uniform characteristics throughout. For example, a mixer 10 may be used to mix lean meat materials with fatty meat materials, to yield a meat mixture having a fat content corresponding to certain specifications provided by a customer. After undergoing the mixing operation in mixer 10, the mixed meat is subjected to a final grinding operation for providing ground meat.

Tub 12 provides a mixing cavity having right and left sides 14 and 16, respectively, and front and rear ends 18 and 20, respectively. Tub 12 is also provided with a bottom 21. Tub 12 is generally rectangular in plan, having a longitudinal tub axis extending between ends 18, 20 midway between and parallel to sides 14, 16.

A pair of mixer paddle assemblies (not shown) extend between front and rear ends 18, 20 of tub 12, as are well known in the art. The mixer paddle assemblies are provided with shafts 22 and 24, which extend longitudinally generally parallel to the longitudinal axis of tub 12. Shafts 22 and 24 have a plurality of arms, such as that shown at 26, extending therefrom. Paddles such as shown at 28 and 30 are connected at the ends of each arm.

A driving assembly (not shown), including one or more motors interconnected with belts and/or pulleys and/or reducing mechanisms, are housed within housing 32. The driving assembly is capable of rotating shafts 22 and 24 in either a clockwise or counterclockwise direction, as desired, all as is well known.

When shafts 22 and 24 of the paddle assemblies are rotated, normally in opposite directions, the arms and paddles of each paddle assembly tend to move materials within tub 12 from one end of tub 12 to the other, as is well known in the art.

Figure 2:
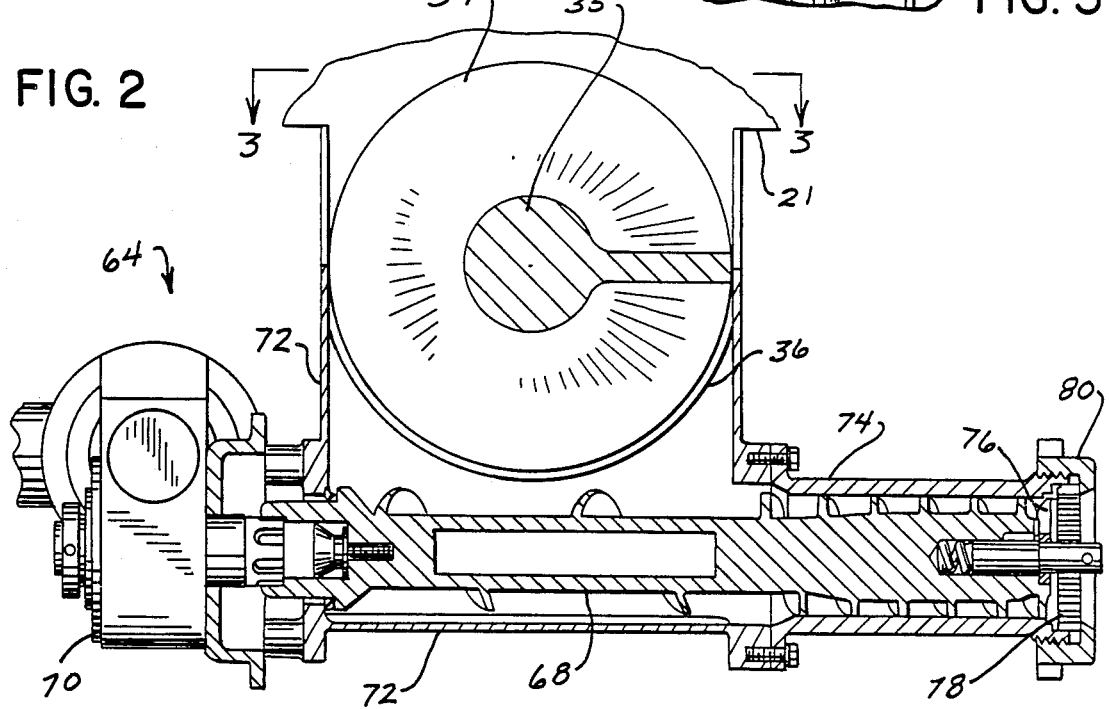
FIG. 2 is a partial cross-sectional view of a sample grinder mounted to the underside of the meat mixer of FIG. 1.

An auger 34 extends between ends 18, 20 of tub 12, and is generally aligned with the longitudinal axis of tub 12. Auger 34 is disposed within a trough 36, which depends from and is connected to bottom 21 of tub 12. Trough 36 provides an input cavity extending between ends 18 and 20 of tub 12, and is generally aligned with the longitudinal axis of tube 12. The open top of trough 36 opens into tub 12 at bottom 21, as best shown in FIG. 2.

A portion of the length of auger 34 projects outwardly from end 18 of tub 12 (not shown). This projecting portion of auger 34 is housed by an auger housing 38, which is connected to trough 36 and end 18 of tub 12.

Auger 34 is formed around a shaft 35, a portion of which extends beyond housing 38 and is connected to a bearing assembly 37. Bearing assembly 37 is supported by a frame 39, which is connected to either side of housing 38.

Auger 34 is connected at its other end to a driving mechanism (not shown), housed within housing 32, as is well known. The driving mechanism is capable of rotating auger 34 either in a clockwise or counterclockwise direction, as desired.

Figure 4:
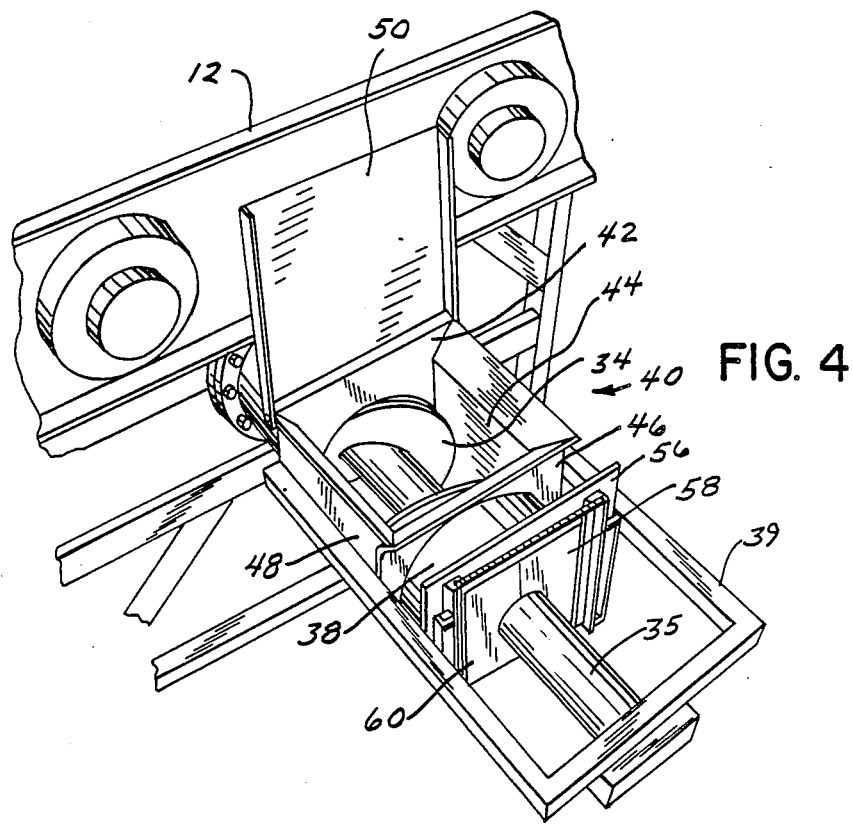
FIG. 4 is a perspectvie view of the bottom loading and unloading mechanism of the meat mixer of FIG. 1.
Figure 5:
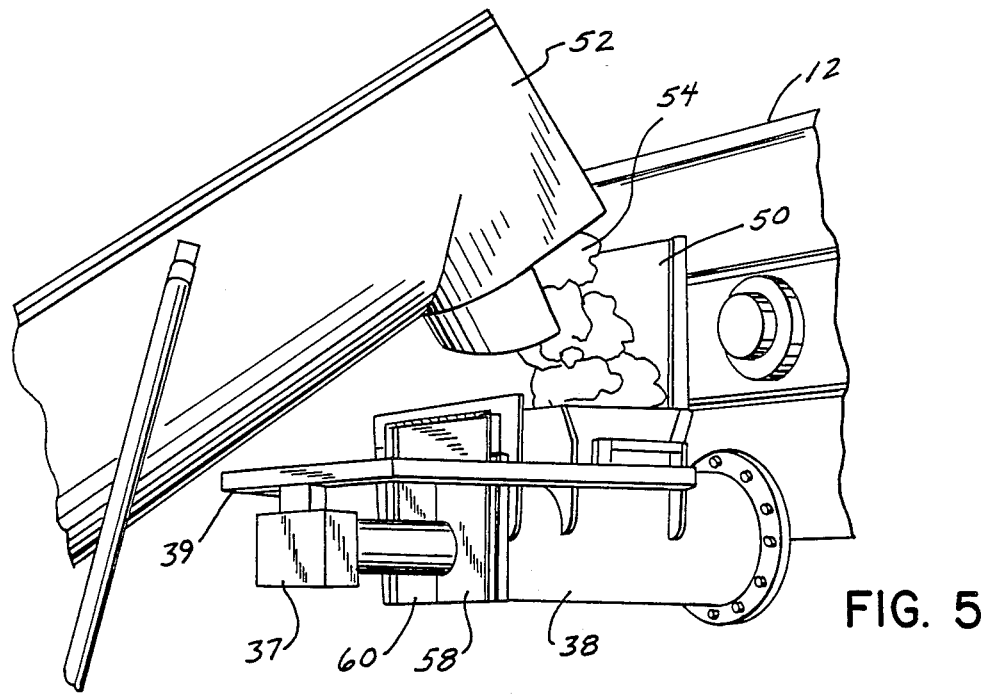
FIG. 5 is a perspective view of the bottom loading and unloading mechanism of the meat mixer of FIG. 1, showing materials being loaded into the mixer.

As shown in FIGS. 1, 4 and 5, auger housing 38 is provided with a hopper 40. Hopper 40 receives materials and introduces the materials into housing 38 and the projecting portion of auger 34 through an opening provided in the top of housing 38. Hopper 40, in cooperation with the opening provided in housing 38, thereby provides a charging means for loading the materials into mixer 10 at a point below the top of tub 12.

Hopper 40 includes upstanding sides 42, 44, 46 and 48 connected to auger housing 38. Sides 42–48 extend from the opening in the top of auger housing 38 leading to load/unload auger 34. Hopper 40 is further provided with a pivotable top 50. Top 50 is movable between a closed position, as shown in FIG. 1, and an open position, as shown in FIG. 4.

For loading of mixer 10, as shown in FIG. 5, pivotable top 50 of hopper 40 is first moved to its open position, as shown. Any suitable conveyor, such as a screw conveyor 52, is then positioned so that its discharge opening is immediately above and adjacent hopper 40. Screw conveyor 52 is then operated so as to elevate the materials to be mixed, such as meat 54, and deposit the materials into hopper 40, at a rate controlled by an operator or by automated control.

During loading of the materials into hopper 40, auger 34 is rotated by the driving mechanism so as to move the materials in a direction away from the inlet in housing 38 and toward tub 12. Auger 34 is preferably rotated at a controlled rate so that the flights of auger 34 are approximately half full of material during the loading operation.

Auger 34 is rotated in a counterclockwise direction during the loading operation to move the material away from the inlet in housing 38 and into the interior of tub 12. By this operation, material is introduced into mixer 10 and conveyed toward end 20 of tub 12. Simultaneously, shafts 22 and 24 of the paddle assemblies are rotated so as to initiate the mixing operation. The paddle assemblies are preferably rotated in opposite directions, so as to tend to move the meat contained within tub 12 from end 20 toward end 18.

When the material conveyed into tube 12 by auger 34 reaches end 20 of the tub 12 during the loading operation, the material is essentially kneaded upon itself and billows upwardly into tub 12 against end 20. The paddle assemblies then incorporate the billowed material into the mixing operation, and tend to move the material away from end 20 as it billows upwardly into tub 12 during the loading operation. This action continues all the while during the loading operation, even when tub 12 becomes relatively full. While tub 12 is filling, the paddles 28 of the paddle assemblies tend to force the material contained within tub 12 into the empty spaces in the flighting of auger 34 as it loads tub 12. This action provides distinct ribbons of material in the flighting of auger 38 during loading. That is, the half of the flighting space is occupied by the material being loaded, and the other half is occupied by material within tub 12 forced into the flighting by paddles 28. Upon reaching end 20 of tub 12, the ribboned material is again kneaded upon itself to provide a mixing action. This process continues throughout loading of tub 12.

The described loading and mixing action provides an efficient and time-saving means for mixing materials. A homogeneous blend is achieved essentially after completion of the loading cycle, and a minimal amount of time is necessary for the actual mixing operation.

During the mixing operation after tub 12 is full, the paddle assemblies are continuously rotated so as to move the meat mixture away from end 20 of tub 12 and toward end 18. Simultaneously, auger 34 is rotated so as to move material away from end 18 of tub 12 and toward end 20. This action of the mixing elements thus provides a back and forth action for the meat mixture, to provide a uniform mix.

After the mixing operation is completed, the direction of rotation of the paddle assemblies is reversed, as is the direction of rotation of auger 34. Therefore, the paddle assemblies tend to move the mixed materials away from end 18 of tub 12 and toward end 20, whereas auger 34 moves the materials away from end 20 and toward end 18. Rotation of auger 34 in this manner unloads the mixed meat through trough 36 and into housing 38 extending from end 18 of tub 12.

A discharge mechanism is provided at the end of housing 38 extending from tub 12. The discharge mechanism includes a gate 56 having a pair of doors 58, 60, which are hinged at their sides. Doors 58 and 60 are adapted to swing outwardly, and are biased toward a normally closed position. As seen in FIGS. 4 and 5, doors 58 and 60 have a cut-out portion for accommodating shaft 35 of auger 34.

When the unloading operation is taking place and material is being moved outwardly of tub 12 through housing 38, the material so moved creates pressure on doors 58 and 60 of gate 56, thereby forcing the doors to open so that the mixed material is discharged therethrough. In a typical installation, another conveyor is positioned beneath gate 56 for conveying the mixed material away from mixer 10. When the mixed material is a coarsely chopped meat, the mixture then undergoes a final grinding operation.

Figure 3:
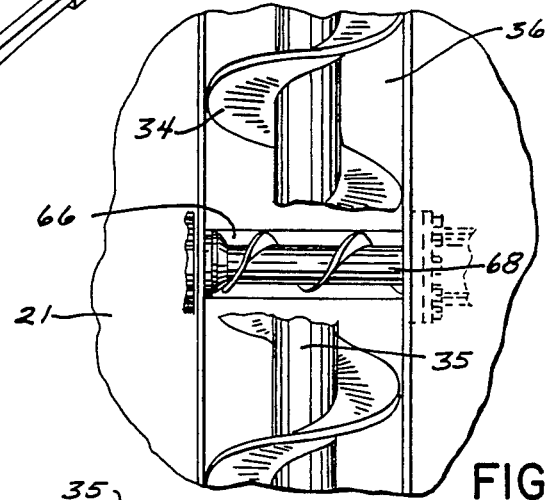
FIG. 3 is a partial plan view taken generally along line 3—3 of FIG. 2, with a portion broken away for clarity.

As seen in FIGS. 1-3, mixer 10 is provided with a sampling means, such as a sample grinder 64. The purpose of sample grinder 64 is to withdraw a sample of the mixed material, such as coarsely chopped meat, during the mixing process, so that the meat mixture can be tested for compliance with specifications during the mixing operation and prior to the final grinding operation.

Sample grinder 64 includes an inlet 66, such as an opening in the bottom of auger trough 36, for introducing the meat mixture into the sample grinder 64. Sample grinder 64 is further provided with a conveying means, such as a sample worm 68, leading from opening 66 for transporting the mixed meat away from opening 66. The longitudinal axis of sample worm 68 is substantially perpendicular to the longitudinal axis of auger 34. A motor assembly 70 drives sample worm 68 so as to advance the meat mixture on worm 68 away from opening 66.

A depending trough 72 is connected to auger trough 36 for providing a sample cavity, and for housing the portion of sample worm 68 directly beneath trough 66. A worm housing 74 extends from trough 72 in a direction transverse to auger through 36. Worm housing 74 houses that portion of sample worm 68 projecting beyond trough 72.

A cutting assembly 76 is provided at the end of sample worm 68, which cooperates with a perforated disk 78 for grinding the mixed meat as it reaches the end of sample worm 68. A threaded ring 80 clamps perforated disk 78 onto worm housing 74. The perforations in disk 78 may be of any desired size. It is preferable that the perforations correspond approximately to the size of the final grind, so that the sample that is ground through sample grinder 64 approximates the size of the final product.

In operation, as previously described, the paddle assemblies of mixer 10 tend to move the meat mixture from one end of tub 12 to the other, while load/unload auger 34 is rotated so as to convey the meat mixture in the opposite direction for achieving a uniform mix. When it is desired to take a sample of the meat mixture, power is supplied to motor 70 for turning sample worm 68 to thereby receive a sample of the meat mixture. The meat mixture passes through opening 66 toward sample worm 68 by the force of gravity, as well as under the weight of the meat mixture within tub 12.

Rotation of sample worm 68 collects a sample of the materials passing over opening 66 in auger trough 36 while the mixing operation is underway. The sample received by sample worm 68 passes along worm 68, through worm housing 74 and toward cutting assembly 76. The meat mixture is then cut by cutting assembly 76 and forced through perforated disk 78, to provide a ground sample of the meat mixture during the mixing operation.

The placement of opening 66 and sample grinder 64 beneath auger 34 allows the taking of a sample which represents a wide range of the zones of mixing within mixer 10. This is because the sample is taken while the mixing operation is underway and the material is being actively moved past opening 66 by auger 34. The material passing by in this manner necessarily represents several zones of mixing, due to the back and forth action of the mixing elements, as described previously. This is in direct contrast to previous sampling methods, which entailed halting of the mixing operation so that a sample of the meat mixture could be retrieved from an isolated point within tub 12.

Obtaining a ground sample of mixed meat in the manner described is highly desirable for a number of reasons. First, the ground sample provides for a more accurate x-ray test of the fat content of the meat mixture than does simply obtaining an unground sample of the meat mixture. This is because obtaining the sample in ground form reduces the effect of such variables as air pockets, which can skew the test results. Also, as mentioned, the sample obtained is representative of numerous mixing zones, which was not possible previously with manual sampling. Further, obtaining a ground sample of the meat mixture prior to the final grinding operation eliminates the need for obtaining a sample of the meat mixture during the final grinding operation. In the past, if sampling were done at the final grinding operation, and it was found that the fat content of the meat mixture was outside specifications, the mixing operation had to be repeated for the addition of fat or lean meat material to bring the meat mixture within specification. Obtaining a ground sample of the meat mixture prior to the performance of the final grinding operation thus provides an accurate picture of fat content, and allows the final grinding operation to be performed without interruption for sampling.

Various alternatives are contemplated as being within the scope of the following claims particularly pointing out and distinctly claiming the invention.

We claim:

1. A mixer for mixing coarsely chopped meat during a mixing operation prior to grinding of said meat during a grinding operation, comprising:
   a tub extending along a longitudinal tub axis, said tub having a depending trough connected to its underside and opening into said tub throughout its length, said trough extending along said longitudinal tub axis;
   an auger disposed in said trough and having a portion projecting from an end of said tub, said auger being reversible so as to be capable of moving said meat within said cavity in both directions along its length for loading and unloading said meat to and from said mixer;
   an auger housing extending from an end of said tub for housing said projecting portion of said auger;
   inlet means provided at the top of said auger housing for providing an inlet for said meat, so that said meat may be introduced into said mixer by said auger conveying said meat in a first direction away from said inlet during loading of said meat into said mixer through said trough during said mixing operation;
   mixing means disposed within said tub, said mixing means comprising a pair of rotatably mounted shafts extending between the ends of said tub generally parallel to said longitudinal tub axis, said shafts having a plurality of arms extending radially therefrom, said arms being provided with paddles for mixing said meat, said paddles being adapted to move said meat from one end of said tub toward the other end of said tub in a second direction opposite said first direction during said mixing operation, said paddles being adapted to move said meat in said first direction when said shafts are rotated in a reverse direction during unloading of said mixer;

discharge means connected to said auger housing and including a primary outlet for unloading said mixer when said auger moves said meat in said second direction during unloading of said mixer; and a sample grinder connected to the underside of said trough, said sample grinder comprising:

a sample inlet comprising an opening in said trough for providing a sample of mixed meat as said meat is moved thereby by said auger during said mixing operation;

a sample worm leading from said opening for conveying said mixed meat away from said opening;

a sample discharge outlet; and grinder means adjacent said sample discharge outlet for providing a ground sample of said mixed meat at a location other than said primary outlet prior to said grinding operation.

2. The invention according to claim 1, wherein said sample worm is disposed so as to be substantially perpendicular to said auger.

3. The invention according to claim 1, wherein said opening is disposed in the bottom of said trough, and wherein said sample grinder receives said sample by said meat passing through said opening.

* * * * *